United States Patent
Freedman et al.

(10) Patent No.: US 6,461,706 B1
(45) Date of Patent: *Oct. 8, 2002

(54) MULTILAYER FILMS AND LABELS

(75) Inventors: Melvin S. Freedman, Beachwood, OH (US); Ramin Heydarpour, Beverly Hills, CA (US); Donald F. Kimes, Perry, OH (US); Mitchell J. Rackovan, Madison, OH (US); Karl Josephy, Los Angeles, CA (US); Eng-Pi Chang, Arcadia, CA (US); Johannes Schut, Alphen aan den Rijn (NL); Edward I. Sun, Arcadia, CA (US); Yao-Feng Wang, Diamond Bar, CA (US)

(73) Assignee: Avery Dennison Corporation, Pasadena, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,203

(22) Filed: Apr. 17, 1998

(51) Int. Cl.⁷ .................................. B32B 27/32
(52) U.S. Cl. ............... 428/40.1; 428/41.8; 428/312; 428/315; 428/220; 428/343; 428/516; 428/910
(58) Field of Search ............... 428/910, 515, 516, 40.1, 41.8, 343, 213, 220, 215

(56) References Cited

U.S. PATENT DOCUMENTS

| | | | |
|---|---|---|---|
| 4,147,827 A | 4/1979 | Breidt, Jr. et al. | 428/218 |
| 4,377,616 A * | 3/1983 | Ashcraft et al. | 428/213 |
| 4,663,216 A * | 5/1987 | Toyoda et al. | 428/212 |
| 4,713,273 A | 12/1987 | Freedman | 428/40 |
| RE32,929 E | 5/1989 | Ewing | 428/220 |
| 5,186,782 A | 2/1993 | Freedman | 156/244.11 |
| 5,194,324 A | 3/1993 | Poirier | 428/315.5 |
| 5,242,650 A | 9/1993 | Rackovan et al. | 264/509 |
| 5,314,749 A | 5/1994 | Shah | 428/349 |
| 5,358,792 A | 10/1994 | Mehta et al. | 428/516 |
| 5,435,963 A | 7/1995 | Rackovan et al. | 264/509 |
| 5,455,092 A | 10/1995 | Tung | 428/40 |
| 5,462,809 A | 10/1995 | Berkowitz | 428/546 |
| 5,468,440 A | 11/1995 | McAlpin et al. | 264/291 |
| 5,475,075 A | 12/1995 | Brant et al. | 526/348.3 |
| 5,530,054 A | 6/1996 | Tse et al. | 524/474 |
| 5,691,043 A * | 11/1997 | Keller et al. | 428/212 |
| 5,858,552 A * | 1/1999 | Bader et al. | 428/516 |
| 6,150,013 A * | 11/2000 | Balaji et al. | 428/220 |

FOREIGN PATENT DOCUMENTS

| | | |
|---|---|---|
| EP | 335425 | 2/1986 |
| GB | 2226297 | 12/1989 |
| JP | 5949971 | 3/1984 |

* cited by examiner

*Primary Examiner*—D. Lawrence Tarazano
(74) *Attorney, Agent, or Firm*—Renner, Otto, Boisselle & Sklar, LLP

(57) ABSTRACT

A multilayer film facestock for labels is described which comprises a base layer having an upper surface and a lower surface, and at least a first skin layer bonded to the upper surface of the base layer by a tie layer wherein the base layer comprises a propylene homopolymer or copolymer, or a blend of a propylene homopolymer and at least one propylene copolymer, and the first skin layer consists essentially of at least one polyethylene having a density of about 0.940 $g/cm^3$ or less. In one preferred embodiment, at least the base layer is machine direction oriented. In another embodiment, the base layer comprises a polyethylene having a density above 0.940 $g/cm^3$ (high density) and the polyethylene is ultimately oriented in the machine direction. Adhesive containing multilayer labelstocks for use in adhesive labels also are described which comprise the multilayer film facestock described above and an adhesive layer adhesively joined to the lower surface of the base layer. Labels prepared from the facestock and the labelstock also are described.

69 Claims, 1 Drawing Sheet

US 6,461,706 B1

MULTILAYER FILMS AND LABELS

FIELD OF THE INVENTION

This invention relates to multilayer films having at least one exposed surface layer of polyethylene. The invention also relates to the preparation of labels and other composites using such multilayer polymer films as facestock.

BACKGROUND OF THE INVENTION

It has long been known to manufacture and distribute pressure-sensitive adhesive stock for labels by providing a layer of face or facestock material for the label or sign backed by a layer of pressure-sensitive adhesive which in turn is covered by a release liner or carrier. The liner or carrier protects the adhesive during shipment and storage and allows for efficient handling of an array of individual labels after the labels are die-cut and the matrix is stripped from the layer of facestock material and up to the point where the individual labels are dispensed in sequence on a labeling line. During the time from die-cutting to dispensing, the liner or carrier remains uncut and may be rolled and unrolled for storage, transit and deployment of the array of individual labels carried thereon.

Failure to reliably dispense is typically characterized by the label following the carrier around a peel plate without dispensing or "standing-off" from the carrier for application to the substrate. Such failure to dispense is believed to be associated with excessive release values between the label facestock material and the liner. Dispensibility also is dependent upon the stiffness of the facestock. Failure to dispense may also be characterized by the wrinkling of the label due to lack of label stiffness at the dispensing speed as it is transferred from the carrier to the substrate. Another particular need in many labeling applications is the ability to apply polymeric-film labels at high line speeds, since an increase in line speed has obvious cost saving advantages.

In many label applications, it is desirable that the facestock material be a film of polymeric material which can provide properties lacking in paper, such as clarity, durability, strength, water-resistance, abrasion-resistance, gloss and other properties. Historically, polymeric facestock material of thicknesses greater than about 3 mils (75 microns) have been used in order to assure dispensability in automatic labeling apparatuses. For example, plasticized polyvinyl chloride films about 3.5 to 4.0 mils (87.5 to 100 microns) thick were used in label application because these films exhibited the desired flexibility characteristics. However, the migration of the plasticizers used in PVC films to convert the normally rigid films to flexible films was recognized as a major problem area for these types of films resulting in loss of desirable properties such as adhesion, color buildup, shrinkage, and flexibility. Eventually, migration of the plasticizer results in wrinkling, cracking and visual deterioration of the facestock and/or label. Also, it is desirable to reduce the thickness or "down-gauge" the facestock material in order to attain savings in material costs. Such reduction in facestock thickness often has resulted in reduced stiffness and the inability to die-cut and dispense the labels in a reliable commercially acceptable manner using automatic machinery. There also was pressure for environmental reasons to prepare labels from polymer facestocks other than polyvinyl chloride.

Polymeric materials suggested in the prior art as useful in preparing labels include biaxially-oriented polypropylene ("BOPP") of thicknesses down to about 2.0 mils (50 microns). These materials provide cost savings as they are relatively inexpensive, and they have sufficient stiffness to dispense well. However, these materials also have relatively high tensile modulus values in both machine-direction (MD) and cross direction (CD) which results in unacceptable conformability characteristics. When biaxially-oriented films are applied to rigid substrates such as glass bottles, the application is not completely successful. The relatively stiff labels have a tendency to bridge surface depressions and the mold seams resulting from bottle-forming processes resulting in an undesirable surface appearance of the applied label simulating trapped air bubbles. This has somewhat impeded the use of pressure-sensitive adhesive labels to replace prior glass bottle labeling techniques such as ceramic ink directly bonded to the bottle surface during glass bottle manufacturing processes as customers find the appearance unattractive. Such ceramic ink techniques are environmentally undesirable due to objectionable ink components and the contamination of the ink in the crushed bottle glass in recycling processes. Attempts to use the relatively stiff oriented polypropylene films on flexible substrates such as plastic bottles also have not been completely successful because the labels do not have the flexibility required to conform to the flexible plastic containers. Oriented polypropylene films are also more difficult to print than PVC or polyethylene films.

Other useful materials are unoriented polyethylene and polypropylene films that are also relatively inexpensive and conformable. However, both of these films are difficult to die-cut and do not dispense well at low calipers. In Europe, an unoriented, relatively thick polyethylene facestock has been used successfully in preparing labels. The facestock is die-cuttable and the labels can de dispensed in high speed automatic dispensing equipment. The normal thickness of this "standard" polyethylene facestock in Europe is about 4.0 mils (100 microns). Attempts to reduce the gauge of the polyethylene facestock to reduce costs has not yet met with any degree of success because the thinner polyethylene facestock is not readily die-cuttable with the die leaving a mark on the liner and stringers on the cut label. Additionally, the thinner facestock becomes difficult to dispense at higher speeds over a peel plate because of reduced stiffness. It also is desirable to develop a thinner facestock based on polyethylene since printing technologies and inks have been developed which are successful in printing polyethylene. Converters will be able to utilize and print on the thinner polyethylene films without changing the print technology and inks they are using presently.

Accordingly, it is desirable to prepare a polyethylene containing facestock which is thinner than the "standard" 4 mils, printable, die-cuttable and dispensible.

SUMMARY OF THE INVENTION

One embodiment of this invention is a multilayer film facestock for labels which comprises a base layer having an upper surface and a lower surface, and at least a first skin layer bonded to the upper surface of the base layer by a tie layer wherein the base layer comprises a propylene homopolymer or copolymer, or a blend of a propylene homopolymer and at least one propylene copolymer, and the first skin layer consists essentially of at least one polyethylene having a density of about 0.940 g/cm$^3$ or less. In one preferred embodiment, at least the base layer is machine direction oriented. In another embodiment, the base layer may comprise a high density polyethylene that is ultimately machine direction oriented.

Adhesive containing multilayer labelstocks for use in adhesive labels also are described which comprise the multilayer film facestock described above and an adhesive layer adhesively joined to the lower surface of the base layer. Labels prepared from the facestock and the labelstock also are described.

DESCRIPTION OF THE PREFERRED EMBODIMENTS

The present invention, in one embodiment, relates to the discovery that a multilayer film facestock useful in preparing printable or printed labels can be prepared at a thinner gauge which exhibits the desirable features of the "standard" polyethylene facestock such as printability, stiffness, flexibility, die-cuttability and dispensibility. The multilayer film facestock of the invention comprises, in one embodiment, a base layer having an upper surface and a lower surface, and at least a first skin layer bonded to the upper surface of the base layer by a tie layer wherein the base layer comprises a propylene homopolymer or copolymer, or a blend of a propylene homopolymer and at least one propylene copolymer, and the first skin layer consists essentially of at least one polyethylene having a density of about 0.940 g/cm³ or less.

Figure 1:
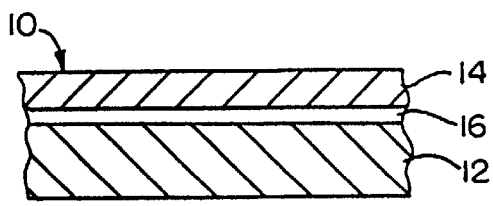
FIG. 1 is a cross-section of a facestock of the present invention comprising three layers.

This embodiment which comprises at least three layers is illustrated as label 10 in FIG. 1 and comprises a base layer 12 and a skin layer 14 which is bonded to the upper surface of the base layer 12 by tie layer 16. The skin layer 14 in FIG. 1 is generally referred to herein as the first skin layer of the multilayer film facestock of the invention.

As noted above, the base layer comprises a propylene homopolymer or copolymer, or a blend of a propylene homopolymer and at least one propylene copolymer. When blends of homopolymers and copolymers are used in the base layer, the blends may comprise from about 5% to about 95% of the homopolymer and correspondingly from about 95% to about 5% by weight of the copolymer. The propylene homopolymers which may be utilized as the base material either alone or in combination with a propylene copolymer as described herein, include a variety of propylene homopolymers such as those having melt flow rates (MFR) from about 1 to about 20 as determined by ASTM Test D1238, condition L. Propylene homopolymers having MFRs of at least about 4 (preferably at least about 8) are particularly useful and provide facestocks having improved die-cuttability. Useful propylene homopolymers also may be characterized as having densities in the range of about 0.88 to about 0.92 g/cm³. A number of useful propylene homopolymers are available commercially from a variety of sources. Some of the useful homopolymers are listed and described in the following Table I.

TABLE I

Commercial Propylene Homopolymers

| Commercial Designation | Company | Melt Flow g/10 min | Density (g/cm³) |
|---|---|---|---|
| WRD5-1057 | Union Carbide | 12.0 | 0.90 |
| DX5E66 | Union Carbide | 8.8 | 0.90 |
| 5A97 | Union Carbide | 3.9 | 0.90 |
| Z9470 | Fina | 5.0 | 0.89 |
| Z9470HB | Fina | 5.0 | 0.89 |
| Z9550 | Fina | 10.0 | 0.89 |
| 6671XBB | Fina | 11.0 | 0.89 |
| 3576X | Fina | 9.0 | 0.89 |
| 3272 | Fina | 1.8 | 0.89 |
| SF6100 | Montell | 11.0 | 0.90 |

The propylene copolymers which may be utilized in the base layer generally comprise copolymers of propylene and up to about 40% by weight of at least one alpha-olefin selected from ethylene and alpha-olefins containing from 4 to about 8 carbon atoms. Examples of useful alpha-olefins include ethylene, 1-butene, 1-pentene, 4-methyl-1-pentene, 1-hexene, 1-heptene, and 1-octene. More often, the copolymers of propylene which are utilized in the present invention comprise copolymers of propylene with ethylene, 1-butene or 1-octene. The propylene alpha-olefin copolymers useful in the present invention include random as well as block copolymers although the random copolymers generally are preferred. Blends of the copolymers as well as blends of the copolymers with propylene homopolymers can be utilized as the composition for the base layer. In one preferred embodiment, the propylene copolymers are propylene-ethylene copolymers with ethylenic contents of from about 0.2% to about 10% by weight. Preferably, the ethylene content is from about 3% to about 10% by weight and more preferably from about 3% to about 6% by weight. With regard to the propylene-1-butene copolymers, 1-butene contents of up to about 15% by weight are useful. In one embodiment, the 1-butene content generally may range from about 3% by weight up to about 15% by weight, and in other embodiments, the range may be from about 5% to about 15% by weight. Propylene-1-octene copolymers useful in the present invention may contain up to about 40% by weight of 1-octene. More often, the propylene-1-octene copolymers will contain up to about 20% by weight of 1-octene.

The propylene copolymers useful in preparing the film facestock of the present invention may be prepared by techniques well known to those skilled in the art, and many such copolymers are available commercially. For example, the copolymers useful in the present invention may be obtained by copolymerization of propylene with an alpha-olefin such as ethylene or 1-butene using single-site metallocene catalysts. A list of some useful commercially available propylene copolymers is found in the following Table II. The propylene copolymers useful in the invention have an MFR of from about 1 to about 20, preferably from about 1 to about 12. Improved die-cuttability is obtained when the propylene copolymers have MFRs of at least about 4.

TABLE II

Commercial Propylene Copolymers

| Commercial Name | Source | % Ethylene | % 1-Butene | Melt Flow Rate (g/10 mins) | Density (g/cm³) |
|---|---|---|---|---|---|
| DS4D05 | Union Carbide | — | 14 | 6.5 | 0.890 |
| DS6D20 | Union Carbide | 3.2 | — | 1.9 | 0.890 |
| DS6D81 | Union Carbide | 5.5 | — | 5.0 | NA |
| SRD4-127 | Union Carbide | — | 8 | 8.0 | NA |
| SRD4-104 | Union Carbide | — | 11 | 5.0 | NA |
| SRD4-105 | Union Carbide | — | 14 | 5.0 | NA |

In another embodiment of the invention, the base layer may comprise a high density polyethylene which is ultimately oriented in the machine direction. Polyethylene films having a density above about 0.940 g/cm³ and up to about 0.980 g/cm³ which have been stretch oriented in the machine direction are particularly useful. Stretch ratios may range from about 2:1 to about 9:1. In this embodiment, the tie layer between the base layer and the first skin layer is optional because both layers contain polyethylene.

The base layer may contain other additives to modify the properties of the base layer and the facestock. For example, colorants may be included in the base layer such as $TiO_2$, $CaCO_3$, etc. The presence of small amounts of $TiO_2$, for example, results in a white facestock. Antiblock agents also can be included in the base layer. AB-5 is an antiblock concentrate available from A. Schulman Inc., 3550 West Market Street, Akron, Ohio 44333, which comprises 5% solid synthetic amorphous silica in 95% low density polyethylene. ABPP05SC is an antiblock concentrate from Schulman containing 5% of the synthetic amorphous silica in a propylene copolymer. The amount of antiblock agent (silica) present in the base layer may range from about 500 to about 5000 ppm, with amounts of about 1000 ppm being preferred. In some embodiments, it also is advantageous to add flexible polyolefins to the base layer to reduce graininess and reduce CD splitting. Useful flexible polyolefins (polypropylene copolymers) are available from Rexene under the trade designation W-105, W-107, and W-113.

The first skin layer which is bonded to the upper surface of the base layer by a tie layer in the multilayer film facestocks of the present invention consists essentially of at least one polyethylene having a density of about 0.940 g/cm³ or less. Such polyethylenes generally are referred to in the art as low density or medium density polyethylenes, and these polyethylene homopolymers can be prepared by techniques well known to those skilled in the art including high pressure, free radical catalyzed processes and processes using metallocene catalysts. Low density polyethylenes and metallocene catalyzed processes for preparing such polyethylenes are described in U.S. Pat. Nos. 5,358,792; 5,462,809; 5,468,440; 5,475,075; and 5,530,054. Each of these patents is hereby incorporated by reference for its disclosure of metallocene catalysts, polyethylenes, and methods for preparing polyethylenes. Metallocene-catalyzed polyethylene generally have a density of from about 0.850 to about 0.925 g/cm³, and more often from about 0.870 to about 0.920 g/cm³.

Useful ethylene homopolymers for the first skin layer include those having densities of from 0.850 up to about 0.940 or less. Polyethylenes having densities of from 0.850 to about 0.925 g/cm³ generally are referred to as low density polyethylenes, and polyethylenes having densities between about 0.925 and 0.940 are referred to in the art as being medium density polyethylenes. The low and medium density polyethylenes useful in the first skin layer also may be characterized as having a melt index (as determined by ASTM Test D1238, condition E) in the range of from 0.5 to about 25. In addition to the above densities, and melt indices, the low density polyethylenes may be characterized by tensile strengths of between about 2200 to about 3200 psi (typically about 2700 psi), and the medium density polyethylenes may be characterized as having tensile strengths of between about 3000 and about 4000 psi (typically about 3400 psi). The determination of whether a low density or medium density polyethylene is to be utilized as the first skin layer is based in part on the film thickness of the skin and the overall thickness of the facestock. Thicker films of lower density polyethylenes generally are preferred because of the softness and relatively low tensile strength of the low density polyethylenes. Conversely, thinner films of medium density polyethylenes can be utilized in the facestocks of the present invention.

Low and medium density polyethylene useful in the first skin layer of the facestock of this invention are available commercially from a variety of sources. Examples of useful polyethylenes are summarized in the following Table III.

TABLE III

Commercial Polyethylenes

| Commercial Designation | Company | Melt Index (g/10 mins) | Density (g/cm³) |
|---|---|---|---|
| Rexene 1017 | Rexene | 2.0 | 0.920 |
| Rexene 1058 | Rexene | 5.5 | 0.922 |
| Rexene 1080 | Rexene | 2.0 | 0.930 |
| Rexene 2030 | Rexene | 5.0 | 0.919 |
| Rexene 2034 | Rexene | 7.5 | 0.925 |
| Rexene 2038 | Rexene | 9.0 | 0.917 |
| Rexene 2040 | Rexene | 12.0 | 0.917 |
| Rexene 2049 | Rexene | 20.0 | 0.917 |
| NA-334 | Equistar | 6.0 | 0.918 |
| NA-217 | Equistar | 5.5 | 0.923 |
| NA 285-003 | Equistar | 6.2 | 0.930 |
| Exact 3027 | Exxon | 3.5 | 0.900 |
| Exact 3022 | Exxon | 9.0 | 0.905 |
| Exact 3139 | Exxon | 7.5 | 0.900 |
| SLP 9053 | Exxon | 7.5 | 0.900 |
| Affinity PF1140 | Dow Chemical | 1.6 | 0.895 |

The first skin layer may also contain other additives such as the antiblock agents described above for the base layer. The amount of the antiblock agent or agents in the first skin layer may range from about 500 to about 5000 ppm with amounts of about 1000 ppm generally being preferred.

The multilayer film stocks of the present invention also comprise at least one tie layer positioned between the base layer and the first skin layer. The tie layer may comprise any polymeric material which improves the adhesion of the first skin layer to the base layer. In one embodiment, the tie layer comprises a mixture of a propylene homopolymer or copolymer and a soft polar additive ("SPA") such as ethylene vinyl acetate copolymer (EVA). Any of the propylene homopolymers or copolymers described above as useful in the base layer can be used in the tie layer. The weight ratio of the propylene polymer or copolymer and the SPA in the blend may range from about 50/50 to 60/40. The soft polar additives generally comprise random copolymers of an olefin and a more polar moiety. In addition to the preferred soft polar additive which is ethylene vinyl acetate copolymer (EVA), the tie layers may include other soft polar additives such as ethylene methylacrylate (EMA) and acrylonitrile butadiene rubber.

Particular examples of such blends useful as the tie layer include a blend containing 50% EVA and 50% of a random propylene copolymer containing about 6% ethylene; a blend of 60% EVA and 40% of a propylene homopolymer; and 50% EMA and 50% of a propylene homopolymer. Specific examples of ethylene vinyl acetate copolymers useful in the present invention are those containing 18% vinyl acetate and 28% vinyl acetate.

The tie layers also may comprise polar additives such as ethylene methylacrylate (EMA) without any additional propylene polymer. Examples of a useful commercially available EMA include EM-803-115 (melt index=3.5), EM 806-009 (melt index=6.0) and EM 802-009 (melt index=2.0) available from Equistar, 1221 McKinney, Houston, Tex. 77252.

Blends of propylene polymers and ethylene polymers can be utilized in the tie layer, and the blends may comprise from about 25 to about 75% of a propylene polymer and correspondingly from about 75 to about 25% of a polyethylene. A blend of 50% by weight of propylene homopolymer 5A97 and 50% by weight of Bynel modified linear low density polyethylene (DuPont) is an example of a blend which is useful as a tie layer. The melt index of the polymers and polymer blends used in the tie layers may range from about 1 to about 20 under test condition E of ASTM Test D 1238. More often the melt index is from about 2 to about 20, and in a most preferred embodiment, the melt index is about 6.

Various nucleating agents and pigments can be incorporated into the film formulations of the present invention. Preferably the nucleating agents are incorporated into the base layer and/or the tie layer, but not in the first skin layer. The amount of nucleating agent added should be an amount sufficient to provide the desired modification of the crystal structure while not having an adverse effect on the desired properties of the facestock. It is generally desired to utilize a nucleating agent to modify the crystal structure and provide a large number of considerably smaller crystals or spherulites to improve the transparency (clarity), and stiffness, and the die-cuttability of the film. Obviously, the amount of nucleating agent added to the film formulation should not have a deleterious affect on the clarity of the film. Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or arylalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium beta-naphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3, 2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of sources. Millad 8C-41-10, Millad 3988 and Millad 3905 are sorbitol nucleating agents available from Milliken Chemical Co.

The amounts of nucleating agent incorporated into the film formulations of the present invention are generally quite small and range from about 100 to about 2000 or 4000 ppm of the total facestock. Preferably the amount of nucleating agent should not exceed about 2000 ppm, and in one embodiment, a concentration of about 300 to 500 ppm appears optimum.

The layers of the three layered facestock illustrated in FIG. 1 can be formed by a variety of techniques known to those skilled in the art including blown or cast extrusion, or extrusion coating or by a combination of these techniques. U.S. Pat. No. 5,186,782 (Freedman), and U.S. Pat. No. 5,242,650 (Rackovan et al) and U.S. Pat. No. 5,435,963 (Rackovan et al) disclose useful procedures for preparing multilayer films, and these patents are hereby incorporated by reference. The three layers can be formed by simultaneous extrusion from a suitable known type of coextrusion die, and the three layers are adhered to each other in a permanently combined state to provide a unitary coextrudate. Alternatively, the base layer can be formed by extrusion of the base layer on a substrate followed by coextrusion coating of the tie layer and first skin layer onto the base layer thereby forming a three layer structure wherein the layers are adhered to each other in a permanently combined state. In another alternative embodiment, the three layers may be separately formed by extrusion and thereafter laminated together by the application of heat and pressure.

Generally, the base layer is relatively thick compared to the first skin layer and the tie layer. In another, although generally not preferred embodiment, the first skin layer may be relatively thick compared to the base layer and the tie layer. Accordingly, thickness ratios for the three layered films as shown in FIG. 1 may range from about 90:5:5 to 5:5:90. However, generally preferred thickness ratios for the three layered films (base: tie: first skin) include 90:5:5, 80:10:10, 70:15:15, 85:5:10, and 80:5:15.

The desirable properties of the multilayer film facestocks of the present invention are improved, particularly with regard to machine direction Gurley stiffness and die-cuttability, when at least the base layer, and more preferably, the entire facestock, has been oriented in the machine direction only. Generally, the base layer and/or facestocks will be oriented in the machine direction at a stretch ratio of at least about 2:1, and more preferably at a stretch ratio of from about 3:1 to about 9:1. In another preferred embodiment, the facestock is oriented in a machine direction at a ratio of about 4:1 to about 6:1. The oriented film facestocks are then preferably heat set or annealed to provide dimensional stability (i.e., to prevent shrinking, relaxing or any distortion of the film).

A multilayer film facestock of the present invention in which only the base layer has been machine direction oriented can be obtained by preparing a machine direction oriented polypropylene film and thereafter coextrusion coating the tie layer and the first skin layer over the oriented polypropylene layer to form a three layer facestock. More often, however, the entire facestock is machine direction oriented after formation, preferably by coextrusion.

The thickness of the multilayer film stock described above and illustrated in FIG. 1 will range from about 0.5 mils (12.5 microns) to about 10 mils (250 microns) depending upon the anticipated utility of the facestock. More often, however, the multilayer film facestocks of the present invention will have a thickness of less than 6 mils (150 microns). Facestock thicknesses of from about 1 to about 6 mils (25 to 150 microns), more often from about 1 to about 4 mils (25 to 100 microns) and most often from about 1.5 to about 2.5 mils (37.5 to 62.5 microns) are particularly useful for preparing labels to be applied to rigid and flexible substrates. As noted earlier, a particular feature of the multilayer film facestocks of the invention is that very thin films (i.e., 1 to 2.5 mils or 25 to 62.5 microns) can be prepared and are useful in forming labels.

Figure 2:
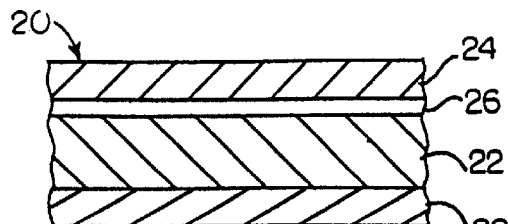
FIG. 2 is a cross-section of a facestock of the present invention comprising four layers.

FIG. 2 illustrates another embodiment of the present invention wherein the multilayer film facestock comprises at least four layers. In FIG. 2, the facestock 20 comprises a base layer 22 having an upper surface and a lower surface, a first skin layer 24 which is joined to the upper surface of base layer 22 by tie layer 26, and a second skin layer 28 which is joined to the lower surface of the base layer 22. The previous description of the base layer, tie layer and first skin layer of the embodiment illustrated in FIG. 1 also applies in its entirety to the embodiment shown in FIG. 2. The only difference between the embodiment shown in FIG. 2 and FIG. 1 is the presence of the second skin layer 28 bonded to the lower surface of the base layer 22.

The composition of the second skin layer 28 may be the same as the first skin layer or different from the composition of the first skin layer. Thus, the second skin layer may consists essentially of the same polyethylene as present in the first skin layer, or the second skin layer may comprise a different polyethylene (e.g., a polyethylene having a different density or prepared by a different procedure).

In one preferred embodiment, the composition of the second skin layer 28 will be different from the composition of the first skin layer 24, and, in this embodiment, the second skin layer may comprise a polyethylene which is different from the polyethylene used in the first skin layer (including low and medium density polyethylenes) or a thermoplastic film forming polymer which is not a polyethylene having a density of about 0.940 g/cm$^3$ or less. Examples of thermoplastic film forming polymers which can be utilized in the second skin layer, either alone or in combination include polyolefins (linear or branched), polyamides, polystyrenes, nylon, polyesters, polyester copolymers, polyurethanes, polysulfones, polyvinylidine chloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Some specific examples of thermoplastics useful as the second skin layer include acrylates such as ethylene methacrylic acid, ethylene methyl acrylate, ethylene acrylic acid and ethylene ethyl acrylate. In one preferred embodiment, the second skin layer comprises a mixture of a polyethylene and a propylene homopolymer or copolymer. The selection of a particular polymer for the second skin layer is dependent on the properties and characteristics which are to be added by the presence of the second skin layer. The polymer for the second skin layer should be compatible with the polymer of the base layer to provide sufficient adhesion to the base layer in the absence of a tie layer. For example, if the base layer contains a propylene polymer, a second skin layer comprising at least some propylene polymer will adhere to the base layer without an intermediate tie layer. It also has been discovered that the use of a composition in the second skin layer that is different from the composition of the first skin layer reduces the blocking tendency when the facestock is rolled on itself.

In one embodiment, it is preferred that the second skin layer comprise a polymer that is softer than the propylene polymer or copolymer, or blends of propylene polymers and copolymers used in the base layer, particularly when the second skin layer is joined with an adhesive to a release coated liner. In particular, it is preferred that the material of the second skin layer has a lower tensile modulus than the tensile modulus of the material comprising the base layer. The use of a lower tensile modulus second skin layer results in a facestock exhibiting improved die-cuttability when compared to a facestock wherein the material of the second skin layer has a higher tensile modulus than the material of the base layer.

It also has been discovered that the facestocks of the present invention comprising at least three layers (i.e., a propylene base layer, a tie layer and a polyethylene first skin layer) exhibit improved die-cuttability when compared to a film of the same propylene polymer base material of equivalent thickness.

The thickness of the second skin layer which is illustrated in FIG. 2 may be varied in the same manner as the first skin layer. Generally, the thickness of the second skin layer will be about the same as the thickness of the first skin layer. The overall thickness of the four layer facestocks illustrated in FIG. 2 can be as high as about 10 mils (250 microns) and as little as 0.5 mils (12.5 microns). In other embodiments, the overall thickness will be in the range of about 1 mil (25 microns) to about 4 mils (100 microns) and most often from about 1.5 to 2.5 mils (37.5 to 62.5 microns).

Figure 3:
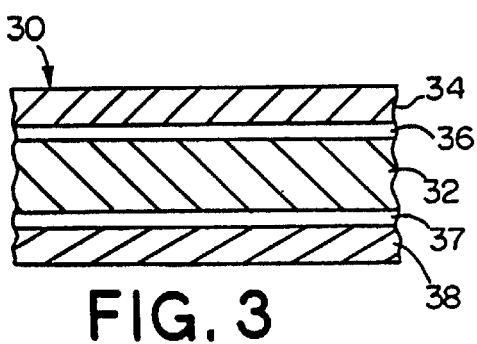
FIG. 3 is a cross-section of a facestock of the present invention comprising five layers.

The multilayer film facestock constructions of the present invention also may comprise at least five layers as illustrated in FIG. 3. In FIG. 3, the facestock 30 comprises a base layer 32, a first skin layer 34 bonded to the upper surface of the base layer 32 by tie layer 36, and a second skin layer 38 bonded to the lower surface of the base layer by tie layer 37. The above discussions regarding the composition and nature of the base layer, tie layers and first and second skin layers in the embodiments illustrated in FIGS. 1 and 2 are applicable to the embodiment illustrated in FIG. 3. Any of the materials described as being useful for the base layer, the tie layer and the first and second skin layers of FIG. 2 are useful in the corresponding layers of FIG. 3. In FIG. 3, the composition of the first skin layer 34 and the second skin layer 38 may be the same or different, and the compositions of the first tie layer 36 and the second tie layer 37 also may be the same or different. Although the base layers are illustrated in FIGS. 1–3 (and FIG. 4) as a single layer, the base layer may comprise more than one layer.

As in the embodiment illustrated in FIG. 1, it is preferred that at least the base layer of the multilayer film facestocks illustrated in FIGS. 2 and 3 is machine direction oriented. More preferably, the entire multilayer film facestock is formed by coextrusion and is oriented in the machine direction at a stretch ratio of at least 2:1, more often at a stretch ratio of about 3:1 to about 9:1, and most often at a stretch ratio of about 5:1 to about 6:1.

The overall thickness of the embodiment illustrated in FIG. 3 can be as much as 10 mils (250 microns) and as little as 0.5 mils (12.5 microns). As in other embodiments, the facestock is preferably a thin facestock of about 1 mil (25 microns) to about 4 mils (100 microns). More often, the facestock is between about 1.5 and about 2.5 mils (37.5 to 62.5 microns). As in earlier embodiments, the thicknesses of the various layers can be varied. Preferred thickness ratios for the five layered films (first skin layer through second skin layer) include 5:5:80:5:5; 10:5:70:5:10; 10:10:60:10:10; 5:10:70:10:5; 10:5:70:10:5; 15:5:60:5:15; etc. In one preferred embodiment the relative thickness is 10:5:70:5:10.

Figure 4:
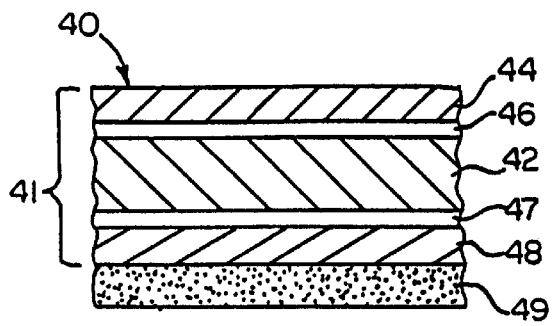
FIG. 4 is a cross-section of a labelstock in accordance with the present invention comprising the facestock illustrated in FIG. 3 with an adhesive layer.

FIG. 4 illustrates yet another embodiment of the present invention which relates to a multilayer labelstock for use in preparing adhesive labels. The labelstock comprises a multilayer film facestock 41 and an adhesive layer adhesive 49. The multilayer film facestock 41 of FIG. 4 is similar to the multilayer facestock of FIG. 3 and comprises five layers. The present invention also contemplates adhesive multilayer labelstocks which comprise multilayer film facestocks having 3 or 4 layers and an adhesive layer. Such labelstocks can be illustrated by adding an adhesive layer to the facestocks illustrated in FIGS. 1 and 2 where the adhesive layer is in contact with the exposed surface of the base layer 12 in FIG. 1 or the second skin layer 28 of FIG. 2. The facestock 41 present in the embodiment illustrated in FIG. 4 comprises a base layer 42, a first skin layer 44 joined to the upper surface of the base layer 42 by tie layer 46, and a second skin layer 48 joined to the lower surface of base layer 42 by tie layer 47. The description of the compositions of the various layers of the facestock 30 in the embodiment illustrated in FIG. 3 is also applicable to the facestock 41 in the embodiment illustrated in FIG. 4.

The adhesive layer may be directly coated on the lower surface of the second skin layer 48 in FIG. 4, or the adhesive may be transferred from a liner with which the facestock is combined. Typically, the adhesive layer has a thickness in the range of from about 0.1 to about 2 mils (2.5 to 50 microns). Adhesives suitable for use in labelstocks of the present invention are commonly available in the art. Generally, these adhesives include pressure-sensitive adhesives, heat-activated adhesives, hot melt adhesives, and the like. Pressure-sensitive adhesives are particularly preferred. These include acrylic based adhesives as well as other elastomers such as natural rubber or synthetic rubbers containing polymers or copolymers of styrene, butadiene, acrylonitrile, isoprene and isobutylene. Pressure-sensitive adhesives are well known in the art and any of the known adhesives can be used with the facestocks of the present invention. In one preferred embodiment, the pressure-sensitive adhesives are based on copolymers of acrylic acid esters, such as, for example, 2-ethyl hexyl acrylate, with polar comonomers such as acrylic acid.

The stiffness of the multilayer film facestocks of the present invention is important for proper dispensing of labels over a peel plate at higher line speeds. Orientation of the multilayer film facestocks in the machine direction increases the tensile modulus in the machine direction which contributes to dimensional stability and good print registration. The multilayer film facestocks of the present invention can be oriented in the machine direction by procedures well known to those skilled in the art such as by hot stretching the multilayer film facestock at a stretch ratio of at least 2, and generally at a stretch ratio from about 2 to about 9. After passing around preheated rolls which soften the facestock, the softened facestock is then stretched and thereafter annealed or heat-set, and finally, cooled over a chill roll to complete the hot stretch operation. The facestock may then be taken up in roll form and stored.

The stiffness of the oriented multilayer films in the machine direction generally should be at least about 5, and may be as high as 100 Gurley. More often the stiffness of the oriented multilayer films is in the range of from about 10 to about 25 or 35 Gurley as measured in accordance with the TAPPI Gurley Stiffness Test T543pm. Stiffnesses of from about 15 to about 25 are most preferred.

In the manufacture of labelstock from the above-described multilayer film facestocks in accordance with the invention, liner or carrier stock may be provided. The liner or carrier stock may comprise a multilayer liner made for example as disclosed in U.S. Pat. No. 4,713,273, the disclosure which is incorporated herein by reference, or may be a conventional liner or carrier consisting of a single paper of film layer which may be supplied in roll form. If it has not been previously provided with a release coating and does not itself include components to inherently generate a release surface at its adhesive-contacting face, the liner or carrier may be coated with a release coating (e.g., a silicone). If a release coating is applied, it is dried or cured following application by any suitable means.

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, and the adhesive remains permanently joined to the facestock.

In some applications, the adhesive layer may be a heat-activated adhesive or a hot-melt adhesive such as used in in-mold label applications, as distinguished from a pressure-sensitive adhesive. If the adhesive is a heat-activated adhesive or a hot-melt adhesive, there may be no need for the provision of a release liner for inherent releasability such as is required when using a pressure-sensitive adhesive.

Figure 5A:
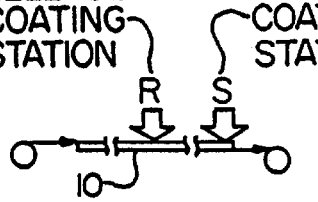
FIGS. 5A to 5D schematically illustrate certain manufacturing steps related to the preparation and the use of the die-cut labels of this invention.
Figure 5B:

The manufacture of pressure-sensitive adhesive labelstock from the above-described facestock in accordance with the invention is illustrated in FIGS. 5A–5D. The liner or carrier stock 10 may comprise a multilayer liner or a conventional liner or carrier consisting of a single paper or film layer which may be supplied in roll form. If it has not been previously provided with a release coating and does not itself include components to inherently generate a release surface at its adhesive-contacting face, the liner or carrier 10 may be coated with a release coating (e.g., a silicone) at station R, as shown in FIG. 5A. If a release coating is applied, it is dried or cured following application by any suitable means (not shown).

The release face of the release liner or carrier may be coated with a layer of pressure-sensitive adhesive for subsequent transfer of the adhesive to the facestock with which the liner or carrier is employed. When the facestock is combined with the liner or carrier (FIG. 5B), the adhesive is joined to the facestock. Later, the liner or carrier is removed to expose the adhesive, which now remains permanently joined to the facestock.

Thus, as indicated in FIG. 5A, adhesive may be applied at station S following drying or cure of the release coat previously applied at station R. This may be a tandem coating operation, or the adhesive coating may be on a separate coating line. Alternatively, the adhesive may be applied to the liner at some later time prior to the joining of the release liner or carrier 10 with the facestock 20, or the adhesive may be coated directly on the facestock 20 prior to the combining of the facestock and liner or carrier. The joining of the liner or carrier 10 with a facestock 20 is diagrammatically illustrated in FIG. 5B.

The label facestock 20 may be printed at a printing station (not shown) prior to being die-cut into individual labels. The printing step may occur before or after the combining of liner and facestock, but will precede the die-cutting of the facestock into individual labels. The film must remain in accurate register between printing steps (for example, between successive impressions in different colors) in order that image or text be of high quality, and between printing and subsequent die-cutting in order that image or text be located properly on the labels. The film is under tension during printing, and may be subjected to some increase in temperature, as for example when UV inks are cured, and the film must maintain dimensional stability in the machine-direction. The MD tensile properties of the facestock film are particularly important when a polymeric film liner is used or when no liner is required.

Figure 5C:
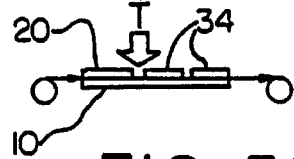

FIG. 5C diagrammatically illustrates the die-cutting of the facestock 20, at a station T, into a series of spaced pressure-sensitive labels 34 carried by the release liner or carrier 10. This step may be performed by rotary cutting dies in a well-known manner and involves the subsequent stripping of the ladder-shaped matrix (not shown) of waste or trim surrounding the formed labels when they are die-cut (the "rungs" of the ladder representing the spacing between successive labels). The labels then remain on the liner in spaced relation with each other, as shown. One failure mode in this operation involves poorly die-cut labels remaining with the matrix as it is stripped. In this mode, as release levels decrease, poor die-cutting is more likely to cause labels to stay attached to the matrix material and be removed from the liner during matrix stripping along with the matrix. Another failure mode occurs when the die-cut goes through the adhesive and part of the liner leaving an impression in the liner. Another failure mode results when the films being die-cut are of insufficient strength. As the strength of the matrix material decreases, the matrix tends to tear as the matrix around the die-cut labels is pulled from the liner. The films of the present invention do have sufficient strength to avoid or reduce breakage of the matrix on stripping.

Figure 5D:
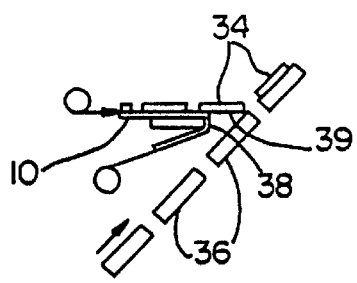

FIG. 5D illustrates the application of the labels 34 to passing workpieces 36 by use of a peel-back edge 38 to dispense the labels 34 by progressively removing the liner or carrier from them to thereby expose the adhesive side 39 of the labels and project the labels into contact with passing workpieces 36. In the context of the present invention, the workpieces 36 may constitute substrates such as glass bottles or other rigid articles tending to have irregularities in the surface and therefore requiring labels that are flexible and that closely adhere (conform) to the surface without bridging local surface depressions. The substrates also may be flexible plastic containers.

It will be understood that the operations shown in FIGS. 5A to 5D may be done at different locations by different manufacturers, or they may be combined. For example, the steps of FIG. 5A may be performed by a liner and adhesive manufacturer, the steps of FIGS. 5B and 5C may be performed by a label manufacturer on one continuous pass rather than being interrupted by a wind/unwind sequence as illustrated, and the steps of FIG. 5D may be performed by a package of manufactured products.

The following Examples identified in Table IV illustrate the multilayer film facestocks of the present invention. Unless otherwise indicated in the following Examples and elsewhere in the specification and claims, all parts and percentages are by weight, temperatures are in degrees Centigrade, and pressures are at or near atmospheric pressure.

Facestocks are prepared by coextrusion of the charges identified in the Examples in the following Table IV. The facestocks are prepared by coextruding the melted charges through a coextrusion die and casting on cooling rolls. The coextrudate is advanced and subsequently hot-stretched by passing around pre-heated rolls which heat the facestock above the glass transition temperature. The stock is then stretched between the pre-heated rolls and pull off rolls, the latter rotating at a multiple of the speed of the former, corresponding to the stretch ratio reported in Table IV. The facestock then passes over annealing rolls where it is annealed or heat set. Finally the facestock passes over a chill roll to complete the hot-stretch operation. The facestock is then recovered.

In Examples 1–3 and 54–60, the thickness ratio of the layers is 5/5/80/5/5. In Examples 4–53 and 60–68 of Table IV, the thickness ratio is 10/5/70/5/10. For Examples 69–70 the thickness ratio is 10/10/70/10. The nominal overall thickness of the multilayer film facestocks of Examples 1–53 is 2.25 mils (56.25 microns), and in Examples 54–70 the overall thickness is 2.5 mils (62.5 microns). In the Examples wherein EVA is used in one or both of the tie layers, the EVA contains 18% w of VA unless otherwise indicated.

TABLE IV

| Example | First Skin | Tie Layer | Base Layer | Tie Layer | Second Skin | MD Draw Ratio |
|---|---|---|---|---|---|---|
| 1 | Rexene 2030 | 50% EVA<br>50% DS4D05 | 50% 5A97<br>50% DS4D05 | 50% EVA<br>50% DS4D05 | Rexene 2030 | 4.5 |
| 2 | Rexene 2030 | 50% EVA<br>50% DS4D05 | 50% 5A97<br>50% DS4D05 | 50% EVA<br>50% DS4D05 | Rexene 2030 | 5.5 |
| 3 | Rexene 2030 | 50% EVA<br>50% DS4D05 | 50% 5A97<br>50% DS4D05 | 50% EVA<br>50% DS4D05 | Rexene 2030 | 6.5 |
| 4 | Rexene 2030 | 50% EVA<br>50% DS4D05 | 50% 5A97<br>50% DS4D05 | 50% EVA<br>50% DS4D05 | Rexene 2030 | 5.5 |
| 5 | Rexene 2030 | 50% EVA<br>50% DS4D05 | 50% 5A97<br>50% DS4D05 | 50% EVA<br>50% DS4D05 | Rexene 2030 | 6.5 |
| 6 | Rexene 1017 | 50% EVA<br>50% DS4D05 | 50% 5A97<br>50% DS4D05 | 50% EVA<br>50% DS4D05 | Rexene 1017 | 5.0 |

TABLE IV-continued

| Example | First Skin | Tie Layer | Base Layer | Tie Layer | Second Skin | MD Draw Ratio |
|---|---|---|---|---|---|---|
| 7 | NA-334 | 50% EVA 50% DS4D05 | 50% 5A97 50% DS4D05 | 50% EVA 50% DS4D05 | NA-334 | 5.0 |
| 8 | NA-217 | 50% EVA 50% DS4D05 | 50% 5A97 50% DS4D05 | 50% EVA 50% DS4D05 | NA-217 | 5.0 |
| 9 | NA-285-003 | 50% EVA 50% DS4D05 | 50% 5A97 50% DS4D05 | 50% EVA 50% DS4D05 | NA-285-003 | 5.0 |
| 10 | Exact 3027 | 50% EVA 50% DS4D05 | 50% 5A97 50% DS4D05 | 50% EVA 50% DS4D05 | Exact 3027 | 5.5 |
| 11 | Exact 3022 | 50% EVA 50% DS4D05 | 50% 5A97 50% DS4D05 | 50% EVA 50% DS4D05 | Exact 3022 | 5.5 |
| 12 | SLP 9087 | 50% EVA 50% DS4D05 | 50% 5A97 50% DS4D05 | 50% EVA 50% DS4D05 | SLP 9087 | 5.5 |
| 13 | SLP 9053 | 50% EVA 50% DS4D05 | 50% 5A97 50% DS4D05 | 50% EVA 50% DS4D05 | SLP 9053 | 5.5 |
| 14 | Exact 3139 | 50% EVA 50% DS4D05 | 50% 5A97 50% DS4D05 | 50% EVA 50% DS4D05 | Exact 3139 | 5.5 |
| 15 | NA-334 | 50% EVA 50% DS4D05 | 50% 5A97 50% DS4D05 | 50% EVA 50% DS4D05 | NA-334 | 5.5 |
| 16 | Rexene 2030 | EM-803-115 | Fina Z9470HB | EM-803-115 | Rexene 2030 | 5.5 |
| 17 | Rexene 2030 | EM-803-115 | Fina Z9470 | EM-803-115 | Rexene 2030 | 5.5 |
| 18 | Rexene 2030 | EM-803-115 | Fina Z9550 | EM-803-115 | Rexene 2030 | 5.5 |
| 19 | Rexene 2030 | EM-803-115 | Fina 6671XBB | EM-803-115 | Rexene 2030 | 5.5 |
| 20 | Rexene 2030 | EM-803-115 | Montell SF6100 | EM-803-115 | Rexene 2030 | 5.5 |
| 21 | Rexene 2030 | EM-803-115 | WRD 5-1057 | EM-803-115 | Rexene 2030 | 5.5 |
| 22 | Rexene 2030 | EM-803-115 | Fina 3576X | EM-803-115 | Rexene 2030 | 5.5 |
| 23 | Rexene 2030 | EM-803-115 | DX-5E66 | EM-803-115 | Rexene 2030 | 5.5 |
| 24 | Rexene 2030 | EM-803-115 | 5A97 | EM-803-115 | Rexene 2030 | 5.5 |
| 25 | Rexene 2030 | EM-803-115 | Fina 3272 | EM-803-115 | Rexene 2030 | 5.5 |
| 26 | Rexene 2030 | 50% EMA 50% 5A97 | 5A97 | 50% EMA 50% 5A97 | Rexene 2030 | 5.5 |
| 27 | Rexene 2030 | 50% EMA 50% Bynel PP | 5A97 | 50% EMA 50% Bynel PP | Rexene 2030 | 5.5 |
| 28 | Rexene 2030 | 50% Bynel PP 50% Bynel LLDPE | 5A97 | 50% Bynel PP 50% Bynel LLDPE | Rexene 2030 | 5.5 |
| 29 | Rexene 2030 | 50% 5A97 50% Bynel LLDPE | 5A97 | 50% 5A97 50% Bynel LLDPE | Rexene 2030 | 5.5 |
| 30 | Rexene 2030 | 50% 5A97 50% EVA (28% VA) | 5A97 | 50% 5A97 50% EVA (28% VA) | Rexene 2030 | 5.5 |
| 31 | Rexene 2030 | 50% 5A97 50% EVA | 5A97 | 50% 5A97 50% EVA | Rexene 2030 | 5.5 |
| 32 | Rexene 2030 | 46% 5A97 50% EVA 4% ARC* | 5A97 | 46% 5A97 50% EVA 4% ARC* | Rexene 2030 | 5.5 |
| 33 | Rexene 2030 | EM-803-115 | 96% 5A97 4% ARC* | EM-803-115 | Rexene 2030 | 5.5 |
| 34 | Rexene 2030 | EM-803-115 | 96% 5A97 4% Millad 8C41-10 | EM-803-115 | Rexene 2030 | 5.5 |
| 35 | Rexene 2030 | 96% EM-803-115 4% Millad 8C41-10 | 5A97 | 96% EM-803-115 4% Millad 8C41-10 | Rexene 2030 | 5.5 |
| 36 | Rexene 2030 | EM-803-115 | 99% WRD5-1057 1% Millad 8C41-10 | EM-803-115 | Rexene 2030 | 5.5 |
| 37 | Rexene 2030 | EM-803-115 | WRD5-1057 | EM-803-115 | Rexene 2030 | 5.0 |
| 38 | Rexene 2030 | EM-803-115 | 80% WRD5-1057 20% DS4D05 | EM-803-115 | Rexene 2030 | 5.0 |
| 39 | Rexene 2030 | EM-803-115 | 80% WRD5-1057 20% W105 | EM-803-115 | Rexene 2030 | 5.0 |
| 40 | Rexene 2030 | EM-803-115 | 80% NRD5-1377 20% W105 | EM-803-115 | Rexene 2030 | 5.0 |
| 41 | Rexene 2030 | EM-803-115 | NRD5-1377 | EM-803-115 | Rexene 2030 | 5.0 |
| 42 | Rexene 2030 | EM-803-115 | 99% WRD5-1057 1% Millad 8C41-10 | EM-803-115 | Rexene 2030 | 5.0 |
| 43 | Rexene 2030 | EM-803-115 | 30% WRD5-1057 20% W105 25% 5A97 10% CaCO$_3$ 15% TiO$_2$ | EM-803-115 | Rexene 2030 | 5.0 |
| 44 | Rexene 2030 | EM-803-115 | 20% WRD5-1057 30% W105 25% 5A97 10% CaCO$_3$ 15% TiO$_2$ | EM-803-115 | Rexene 2030 | 5.0 |

TABLE IV-continued

| Example | First Skin | Tie Layer | Base Layer | Tie Layer | Second Skin | MD Draw Ratio |
|---|---|---|---|---|---|---|
| 45 | Rexene 2030 | EM-803-115 | 30% WRD5-1057<br>20% DS4D05<br>25% 5A97<br>10% CaCO$_3$<br>15% TiO$_2$ | EM-803-115 | Rexene 2030 | 5.0 |
| 46 | Rexene 2030 | EM-803-115 | 29% WRD5-1057<br>20% W105<br>25% 5A97<br>10% CaCO$_3$<br>15% TiO$_2$<br>1% Millad 8C41-10 | EM-803-115 | Rexene 2030 | 5.0 |
| 47 | Rexene 2030 | EM-803-115 | 5A97 | EM-803-115 | Rexene 2030 | 5.0 |
| 48 | Rexene 2030 | EM-803-115 | DX5E66 | EM-803-115 | Rexene 2030 | 5.0 |
| 49 | Rexene 2030 | EM-803-115 | WRD-1057 | EM-803-115 | Rexene 2030 | 5.0 |
| 50 | Rexene 2030 | EM-803-115 | 98% WRD5-1057<br>2% Millad 8C41-10 | EM-803-115 | Rexene 2030 | 5.0 |
| 51 | Rexene 2030 | EM-803-115 | 98% DX5E66<br>2% Millad 8C41-10 | EM-803-115 | Rexene 2030 | 5.0 |
| 52 | Rexene 2030 | EM-803-115 | 99% DX5E66<br>1% Millad 8C41-10 | EM-803-115 | Rexene 2030 | 5.0 |
| 53 | Rexene 2030 | EM-803-115 | 98% 5A97<br>2% Millad 8C41-10 | EM-803-115 | Rexene 2030 | 5.0 |
| 54 | 98% PF1140<br>2% AB-5 | 50% UE631-04<br>50% DS4D05 | DS4D05 | 50% UE631-04<br>50% DS4D05 | 98% PF1140<br>2% AB-5 | 4.5 |
| 55 | 95% Rexene 2038<br>5% AB-5 | 50% UE631-04<br>50% DS4D05 | 50% DS4D05<br>50% 5A97 | 50% UE631-04<br>50% DS4D05 | 95% Rexene 2038<br>5% AB-5 | 5.5 |
| 56 | 95% Rexene 2040<br>5% AB-5 | 50% UE631-04<br>50% DS4D05 | 50% DS4D05<br>50% 5A97 | 50% UE631-04<br>50% DS4D05 | 95% Rexene 2040<br>5% AB-5 | 5.5 |
| 57 | 95% Rexene 2049<br>5% AB-5 | 50% UE631-04<br>50% DS4D05 | 50% DS4D05<br>50% 5A97 | 50% UE631-04<br>50% DS4D05 | 95% Rexene 2049<br>5% AB-5 | 5.5 |
| 58 | 95% Rexene 1017<br>5% AB-5 | 50% UE631-04<br>50% DS4D05 | 50% DS4D05<br>50% 5A97 | 50% UE631-04<br>50% DS4D05 | 95% Rexene 1017<br>5% AB-5 | 5.5 |
| 59 | Rexene 2049 | 50% UE631-04<br>50% DS4D05 | 50% DS4D05<br>50% 5A97 | 50% UE631-04<br>50% DS4D05 | Rexene 2049 | 5.5 |
| 60 | Rexene 2030 | 50% UE631-04<br>50% DS4D05 | 50% DS4D05<br>50% 5A97 | 50% UE631-04<br>50% DS4D05 | Rexene 2030 | 4.5 |
| 61 | 98% Rexene 2030<br>2% AB-5 | 50% UE631-04<br>50% DS4D05 | 80% 5A97<br>20% DS4D05 | 50% UE631-04<br>50% DS4D05 | 98% Rexene 2030<br>2% AB-5 | 5.25 |
| 62 | 98% Rexene 2034<br>2% AB-5 | EM-803-115 | 80% 5A97<br>20% DS4D05 | EM-803-115 | 98% Rexene 2034<br>2% AB-5 | 5.0 |
| 63 | 98% Rexene 1058<br>2% AB-5 | EM-803-115 | 80% 5A97<br>20% DS4D05 | EM-803-115 | 98% Rexene 1058<br>2% AB-5 | 5.0 |
| 64 | 98% Rexene 2034<br>2% AB-5 | EM-803-115 | 80% 5A97<br>20% DS4D05 | EM-803-115 | 98% Rexene 2034<br>2% AB-5 | 5.0 |
| 65 | 98% Rexene 2030<br>2% AB-5 | EM-803-115 | 70% WRD5-1057<br>30% W107 | EM-803-115 | 98% Rexene 2030<br>2% AB-5 | 5.0 |
| 66 | 98% Rexene 2030<br>2% AB-5 | EM-803-115 | 50% W107<br>30% TiO$_2$[1]<br>20% CaCO$_3$[2] | EM-803-115 | 98% Rexene 2030<br>2% AB-5 | 5.0 |
| 67 | 98% Rexene 2030<br>2% AB-5 | EM-803-115 | 70% WRD5-1057<br>30% W113 | EM-803-115 | 98% Rexene 2030<br>2% AB-5 | 5 |
| 68 | 97% Rexene 1058<br>3% AB-5 | EM-803-115 | 50% DS4D05<br>30% TiO$_2$[1]<br>20% CaCO$_3$[2] | EM-803-115 | 97% Rexene 1058<br>3% AB-5 | 5 |
| 69 | Rexene 1058 | EM806-009 | 70% WRD5-1057<br>30% DS4D05 | None | 50% HPP[3]<br>50% EVA | 5 |
| 70 | Rexene 1058 | EM803-115 | 70% WRD5-1057<br>30% SD4D05 | None | 50% HPP[4]<br>50% EVA | 5 |

[1]TiO$_2$ concentrate from Schulman comprising 50% w of TiO$_2$ and 50% w of a propylene homopolymer
[2]CaCO$_3$ concentrate from Schulman comprising 40% CaCO$_3$ and 60% propylene homopolymer
[3]Polypropylene homopolymer with melt index of 4
[4]Polypropylene homopolymer with melt index of 12
*ARC = 90% 5A97/10% Millad 3988

The Gurley stiffnesses in the machine direction of the facestocks described in Examples 1–70 (as determined by Tappi Gurley Stiffness Test T543pm) are reported in the following Table V.

Pressure-sensitive laminates are prepared from each of the facestocks prepared in Examples 1–70 comprising (a) the facestock, (b) a release liner, and (c) a pressure-sensitive adhesive between the facestock and the liner (for example, see FIG. 4). The adhesive is a commercial PSA available as "S-1000" from the Chemicals Division of Avery Dennison Corp. The thickness of the adhesive is 20 micrometers. The liner is 65 gsm paper or Glassine.

The die-cuttability of the pressure-sensitive laminates prepared from the facestocks of Examples 1–70 is evaluated by die-cutting shapes in the laminates and thereafter measuring the frictional energy required to separate the matrix from the die-cut shape. The die cut shape includes the facestock and the pressure-sensitive adhesive. A low frictional energy value (e.g., about 150 g-cm or less) indicates the laminate exhibits good die-cuttability. This test which is conducted as follows is described in more detail in copending application Ser. No. 09/062,206, now U.S. Pat. No. 5,961,766 entitled "Method For Selecting A Substrate Intended For Use In A Cutting Operation" filed on the same day as this application, and which copending application is hereby incorporated by reference.

A test sheet of each laminate having the dimensions of 7×10" (17.8×25.4 cm) is advanced through a die-cutter where 10 labels are cut in the facestock. The die-cutter has a cylindrical profile. The die-cutting roll has a diameter of 3 inches (76.2 mm), with one cavity across and 10 cavities around. Each of the cavities are 6 inches (152.4 mm) long (or across), $15/16$ inch (22.25 mm) wide (or deep) and have rounded corners with diameters of $3/32$ inch (2.38 mm). The separation between adjacent cavities is $1/8$ inch (3.175 mm). The anvil roll has a diameter of 5 inches (127 mm). The gap between the anvil and the tip of the die is 2.2 mils (0.0559 mm). The die pressure is 300 psi (208500 kg/M$^2$), and the speed of the die is 15 m/min.

The die-cut in each test sheet is deep enough to penetrate the facestock and pressure-sensitive adhesive, but not the release liner. The labels that are formed are rectangular in shape and arranged side-by-side on the test sheet, one label across and ten deep. The long dimension of each label is parallel to the long dimension of the next adjacent label. The labels have the dimensions of $7/8$×6" (22.25 mm×152.4 mm) and are equidistant from each other. The gap between each label is $1/8$ inch (3.175 mm). A matrix, which consists of the portion of the waste facestock around the labels, is also formed during the die-cutting.

A test sample is formed by cutting the die-cut test sheet along the center line of the long dimension of one label and then along the center line of the long dimension of the next adjacent label. The cuts are parallel to each other. Each test sample consists of one-half of one label, one-half of the next adjacent label sample, the matrix around the label portions, and the adhesive and release liner underlying the label portions and matrix.

The friction energy required to separate the matrix from the die-cut labels of each sample is measured using a modified TA-XT2 Texture Analyzer provided by Stable Micro Systems, Unit 105, Blackdown Rural Industries, Haste Hill, Haslemere, Surrey GU 27 3AY, England. The TA-XT2 Texture Analyzer is a tensile testing device. It is modified as follows: the fixture on the top crosshead is removed and substituted by an upper L-shaped bracket; one arm of the upper L-shaped bracket is attached to the upper frame; the platform mounted on the base is removed and substituted by a lower L-shaped bracket. Each test sample is tested by attaching an edge of the matrix of the test sample to the upper L-shaped bracket, and attaching the edge of each label portion adjacent to the attached matrix edge to the lower L-shaped bracket. The texture analyzer is activated and the matrix is separated from the label portions at a rate of 5 mm/s.

The force used to separate the matrix and the displacement of this force along the length of the test sample during separating is plotted using software provided with the TA-XT2 Texture Analyzer. The area under the plot is also determined using software provided with the TA-XT2 Texture Analyzer. The area under the plot has the units of gram-seconds. The result is multiplied by the stripping speed (5 mm/s) and after making appropriate corrections for units (i.e., mm to cm), the friction energy results are provided in terms of gram-centimeters (g-cm). Higher friction energy numbers are associated with poorly cut facestocks or adhesive flowback. The test results for laminates prepared with the facestocks of Examples 1–67 are summarized in Table V. For each laminate, 20 test samples are tested and the averages for these test samples are given in Table V.

TABLE V

Test Results

| Example | PSA Laminate Friction Energy (g-cm) | Facestock Gurley Stiffness (MD) |
|---|---|---|
| 1 | 162 | 21 |
| 2 | 156 | 25 |
| 3 | 127 | 31 |
| 4 | 110 | 20 |
| 5 | 83 | 24 |
| 6 | 151 | 20 |
| 7 | 131 | 24 |
| 8 | 140 | 23 |
| 9 | 174 | 23 |
| 10 | 183 | NA |
| 11 | 155 | 23 |
| 12 | 148 | 26 |
| 13 | 140 | 29 |
| 14 | 139 | 26 |
| 15 | 125 | 25 |
| 16 | 117 | 8 |
| 17 | 158 | 9 |
| 18 | 121 | 11 |
| 19 | 116 | 15 |
| 20 | 67 | 18 |
| 21 | 76 | 23 |
| 22 | 104 | 23 |
| 23 | 90 | 22 |
| 24 | 149 | 25 |
| 25 | 160 | 25 |
| 26 | 151 | 26 |
| 27 | 105 | 24 |
| 28 | 292 | 29 |
| 29 | 207 | 33 |
| 30 | 116 | 28 |
| 31 | 125 | 33 |
| 32 | 91 | 31 |
| 33 | 77 | 28 |
| 34 | 75 | 27 |
| 35 | 105 | 26 |
| 36 | 32 | NA |
| 37 | 78 | 22 |
| 38 | 93 | 19 |
| 39 | 95 | 17 |
| 40 | 91 | 21 |
| 41 | 92 | 20 |
| 42 | 102 | 22 |
| 43 | 90 | 17 |
| 44 | 111 | 16 |
| 45 | 109 | 20 |
| 46 | 99 | 19 |
| 47 | 138 | 14 |
| 48 | 105 | 12 |
| 49 | 95 | 13 |
| 50 | 76 | 13 |
| 51 | 108 | 12 |
| 52 | 66 | 15 |
| 53 | 120 | 16 |
| 54 | 157 | 17 |
| 55 | 152 | 24 |
| 56 | 143 | 25 |
| 57 | 182 | 27 |
| 58 | 203 | 26 |
| 59 | 170 | 22 |
| 60 | 213 | 24 |
| 61 | 116 | 20 |
| 62 | 132 | 21 |

TABLE V-continued

Test Results

| Example | PSA Laminate Friction Energy (g-cm) | Facestock Gurley Stiffness (MD) |
|---|---|---|
| 63 | 129 | 23 |
| 64 | 88 | 21 |
| 65 | 145 | 18 |
| 66 | 92 | 15 |
| 67 | 70 | 18 |
| 68 | NA | 17 |
| 69 | NA | NA |
| 70 | NA | NA |

The modulus, percent elongation and tensile strength of the facestocks of Examples 54–68 was determined in accordance with ASTM Test D882 entitled "Tensile Properties of Thin Plastic Sheeting". The results are recorded in the following Table VI.

TABLE VI

| Facestock of Example | Modulus (1000 psi) | | Elongation (%) | | Tensile Strength (1000 psi) | |
|---|---|---|---|---|---|---|
| | MD | CD | MD | CD | MD | CD |
| 54 | 229 | 103 | 61 | 908 | 21.8 | 4.6 |
| 55 | 338 | 117 | 30 | 829 | 31.4 | 4.4 |
| 56 | 357 | 117 | 32 | 826 | 33.1 | 4.0 |
| 57 | 359 | 128 | 30 | 630 | 33.7 | 4.0 |
| 58 | 361 | 153 | 29 | 663 | 34.1 | 3.9 |
| 59 | 317 | 117 | 31 | 740 | 31.5 | 3.7 |
| 60 | 277 | 139 | 43 | 813 | 23.7 | 4.4 |
| 61 | 377 | 134 | 29 | 260 | 28.8 | 4.0 |
| 62 | 330 | 142 | 38 | 643 | 27.9 | 4.1 |
| 63 | 375 | 165 | 31 | 367 | 31.5 | 4.3 |
| 64 | 352 | 152 | 33 | 328 | 27.8 | 4.3 |
| 65 | 308 | 134 | 32 | 780 | 25.3 | 3.6 |
| 66 | 205 | 89 | 29 | 613 | 18.3 | 2.1 |
| 67 | 343 | 144 | 31 | 421 | 28.0 | 4.1 |
| 68 | 265 | 92 | 32 | 535 | 21.6 | 2.6 |

As noted earlier, improved die-cuttability is observed when the melt flow rate of the propylene polymer or copolymer used in the base layer is above 4 and even above 8. This is demonstrated by comparing the friction energy values of the PSA laminate prepared from the facestocks of Examples 21, 23 and 24 summarized in the following Table VII.

TABLE VII

| Facestock of Example | MFR of Propylene Base Layer | PSA Laminate Friction Energy (g-cm) |
|---|---|---|
| 21 | 12 | 76 |
| 23 | 8.8 | 90 |
| 24 | 3.9 | 149 |

As can be seen from the results, the friction energy decreased as the MFR of the propylene base layer increased.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A multilayer film facestock for labels comprising a base layer having an upper surface and a lower surface, and at least a first skin layer bonded to the upper surface of the base layer by a tie layer wherein the base layer comprises a propylene homopolymer or copolymer, or a blend of a propylene homopolymer and at least one propylene copolymer, and the first skin layer consists essentially of at least one polyethylene having a density of about 0.940 g/cm$^3$ or less wherein the multilayer facestock or the base layer is oriented in the machine direction only and heat set.

2. The facestock of claim 1 wherein the base layer comprises a propylene homopolymer.

3. The facestock of claim 1 wherein the propylene copolymer of the base layer is a copolymer of propylene and up to about 40% by weight of at least one α-olefin selected from ethylene and α-olefins containing from 4 to about 8 carbon atoms.

4. The facestock of claim 3 wherein the α-olefin is ethylene, 1-butene, or 1-octene.

5. The facestock of claim 1 wherein the base layer comprises a blend of a propylene homopolymer and a propylene-ethylene or a propylene-1-butene copolymer.

6. The facestock of claim 1 wherein the polyethylene of the first skin layer is characterized as having a density of from about 0.850 to about 0.940 g/cm$^3$.

7. The facestock of claim 1 wherein the polyethylene of the first skin layer has a density of from about 0.890 to about 0.925 g/cm$^3$.

8. The facestock of claim 1 wherein the base layer, the tie layer, or both the core and tie layers contain at least one nucleating agent.

9. The facestock of claim 1 wherein the base layer is oriented in the machine direction at a stretch ratio of from about 3:1 to about 9:1.

10. The facestock of claim 1 oriented in the machine direction at a stretch ratio of at least about 2:1.

11. The facestock of claim 1 oriented in the machine direction at a stretch ratio of from about 3:1 to about 9:1.

12. The facestock of claim 1 which has been formed by coextrusion.

13. The facestock of claim 1 wherein the base layer contains at least one pigment.

14. The facestock of claim 1 containing a second skin layer bonded to the lower surface of the base layer.

15. The facestock of claim 14 wherein the composition of the second skin layer is different from the composition of the first skin layer.

16. The facestock of claim 14 wherein the composition of the second skin layer is essentially the same as the composition of first skin layer.

17. The facestock of claim 14 wherein the second skin layer comprises a thermoplastic polymer.

18. The facestock of claim 14 wherein the second skin layer comprises at least one polymer selected from the group of polyolefins, polyamides, polystyrenes, polystyrene-butadiene, polyesters, polyester copolymers, polyurethanes, polysulfones, polyvinylidene chloride, styrene-maleic anhydride copolymers, styrene acrylonitrile copolymers, ionomers based on sodium or zinc salts of ethylene methacrylic acid, polymethylmethacrylates, cellulosics, fluoroplastics, acrylic polymers and copolymers, polycarbonates, polyacrylonitriles, ethylene-vinyl acetate copolymers, and mixtures thereof.

19. The facestock of claim 14 wherein the second skin layer comprises a mixture of a polyethylene and a propylene homopolymer or copolymer.

20. The facestock of claim 14 wherein the second skin layer is bonded to the lower surface of the base layer through a tie layer.

21. The facestock of claim 20 wherein the composition of the second skin layer is different from the composition of the first skin layer.

22. The facestock of claim 20 wherein the second skin layer comprises at least one polymer selected from the group of polyolefins, polyamides, polystyrenes, polystyrene-butadienes, polyesters, polyester copolymers, polyurethanes, polysulfones, polyvinylidene chloride, styrene-maleic anhydride copolymers, styrene acrylonitrile copolymers, ionomers based on sodium or zinc salts of ethylene methacrylic acid, polymethylmethacrylates, cellulosics, fluoroplastics, acrylic polymers and copolymers, polycarbonates, polyacrylonitriles, ethylene-vinyl acetate copolymers, and mixtures thereof.

23. The facestock of claim 20 wherein at least the base layer is oriented in the machine direction at a stretch ratio of at least about 2:1.

24. The facestock of claim 20 which has been formed by coextrusion.

25. The facestock of claim 23 oriented in the machine direction at a stretch ratio of from about 3:1 to about 9:1.

26. The facestock of claim 1 having a thickness up to about 20 mils.

27. The facestock of claim 20 having a thickness of from about 0.5 to about 10 mils.

28. An adhesive containing labelstock for use in adhesive labels which comprises
  (a) a multilayer film facestock comprising a base layer having an upper surface and a lower surface, and at least a first skin layer bonded to the upper surface of the base layer by a tie layer wherein the base layer comprises a propylene homopolymer or copolymer, or a blend of a propylene homopolymer and at least one propylene copolymer, and the first skin layer consists essentially of at least one polyethylene having a density of about 0.940 g/cm$^3$ or less, wherein the multilayer facestock or the base layer is oriented in the machine direction only and heat set, and
  (b) an adhesive layer having an upper surface and a lower surface wherein the upper surface of the adhesive layer is adhesively joined to the lower surface of the base layer.

29. The labelstock of claim 28 wherein the base layer comprises a propylene homopolymer.

30. The labelstock of claim 28 wherein the propylene copolymer of the base layer is a copolymer of propylene and up to about 40% by weight of at least one α-olefin selected from ethylene and α-olefins containing from 4 to about 8 carbon atoms.

31. The labelstock of claim 30 wherein the α-olefin is ethylene, 1-butene, or 1-octene.

32. The labelstock of claim 28 wherein the base layer comprises a blend of a propylene homopolymer and a propylene-ethylene or a propylene-1-butene copolymer.

33. The facestock of claim 28 wherein the propylene homopolymer or copolymer in the base layer has a melt flow rate of at least about 4 g/10 mins.

34. The labelstock of claim 28 wherein the polyethylene of the first skin layer is characterized as having a density of from about 0.870 to about 0.940 g/cm$^3$.

35. The labelstock of claim 28 wherein the polyethylene of the first skin layer has a density of from about 0.880 to about 0.930 g/cm$^3$.

36. The labelstock of claim 28 wherein the core layer, the tie layer, or both the core and tie layers contain at least one nucleating agent.

37. The labelstock of claim 28 wherein the base layer of the facestock is oriented in the machine direction at a stretch ratio of from about 2:1 to about 9:1.

38. The labelstock of claim 28 wherein the facestock has been oriented in the machine direction at a stretch ratio of at least about 2:1.

39. The labelstock of claim 28 wherein the facestock has been oriented in the machine direction at a stretch ratio of from about 3:1 to about 9:1.

40. The labelstock of claim 28 wherein the facestock has been formed by coextrusion.

41. The labelstock of claim 28 wherein the core layer contains at least one pigment.

42. The labelstock of claim 28 wherein the adhesive layer is a pressure-sensitive adhesive layer.

43. The labelstock of claim 28 containing a second skin layer bonded to the lower surface of the base layer.

44. The labelstock of claim 43 wherein the composition of the second skin layer is different from the composition of the first skin layer.

45. The facestock of claim 43 wherein the tensile modulus of the second skin layer is lower than the tensile modulus of the base layer.

46. The labelstock of claim 43 wherein the composition of the second skin layer is essentially the same as the first skin layer.

47. The labelstock of claim 43 wherein the second skin layer comprises a thermoplastic polymer.

48. The labelstock of claim 43 wherein the second skin layer comprises at least one polymer selected from the group of polyolefins, polyamides, polystyrenes, polystyrene-butadienes, polyesters, polyester copolymers, polyurethanes, polysulfones, polyvinylidene chloride, styrene-maleic anhydride copolymers, styrene acrylonitrile copolymers, ionomers based on sodium or zinc salts of ethylene methacrylic acid, polymethylmethacrylates, cellulosics, fluoroplastics, acrylic polymers and copolymers, polycarbonates, polyacrylonitriles, ethylene-vinyl acetate copolymers, and mixtures thereof.

49. The labelstock of claim 43 wherein the second skin layer comprises a mixture of a polyethylene and a propylene homopolymer or copolymer.

50. The labelstock of claim 43 wherein the second skin layer is bonded to the lower surface of the base layer through a tie layer.

51. The facestock of claim 50 wherein the tensile modulus of the second skin layer is lower than the tensile modulus of the base layer.

52. The labelstock of claim 50 wherein the composition of the second skin layer is different from the composition of the first skin layer.

53. The labelstock of claim 50 wherein the second skin layer comprises at least one polymer selected from the group of polyolefins, polyamides, polystyrenes, polystyrene-butadienes, polyesters, polyester copolymers, polyurethanes, polysulfones, polyvinylidene chloride, styrene-maleic anhydride copolymers, styrene acrylonitrile copolymers, ionomers based on sodium or zinc salts of ethylene methacrylic acid, polymethylmethacrylates, cellulosics, fluoroplastics, acrylic polymers and copolymers, polycarbonates, polyacrylonitriles, ethylene-vinyl acetate copolymers, and mixtures thereof.

54. The labelstock of claim 50 wherein at least the base layer of the facestock is oriented in the machine direction at a stretch ratio of at least about 2:1.

55. The labelstock of claim 50 wherein the adhesive layer is a pressure-sensitive adhesive layer.

56. The labelstock of claim 50 wherein the facestock has been formed by coextrusion.

57. The labelstock of claim 50 wherein the facestock has been oriented in the machine direction at a stretch ratio of from about 3:1 to about 9:1.

58. The facestock of claim 50 wherein the propylene homopolymer or copolymer in the base layer has a melt flow rate of at least about 4 g/10 mins.

59. The labelstock of claim 28 having a thickness up to about 20 mils.

60. The labelstock of claim 50 having a thickness of from about 0.5 to about 10 mils.

61. The labelstock of claim 28 also comprising a release coated liner in contact with and releasably joined to the lower surface of the adhesive layer.

62. The labelstock of claim 45 also comprising a release coated liner in contact with and releasably joined to the lower surface of the adhesive layer.

63. A label made from the facestock of claim 1.

64. A pressure sensitive adhesive label die-cut from the labelstock of claim 42.

65. A pressure sensitive adhesive label die-cut from the labelstock of claim 55.

66. An adhesive label die-cut from the labelstock of claim 45.

67. A multilayer film facestock for labels comprising a base layer having an upper surface and a lower surface, and at least a first skin layer in contact with the upper surface of the base layer wherein the base layer comprises a machine direction only oriented and heat set polyethylene having a density above about 0.940 g/cm$^3$, and the first skin layer consists essentially of at least one polyethylene having a density of about 0.940 g/cm$^3$ or less, and, optionally, a tie layer between the base layer and the first skin layer.

68. An adhesive containing multilayer labelstock for use in adhesive labels which comprises (a) a multilayer film facestock comprising a base layer having an upper surface and a lower surface, and at least a first skin layer bonded to the upper surface of the base layer by a tie layer wherein the base layer comprises a machine direction only oriented and heat set polyethylene having a density above about 0.940 g/cm$^3$, and the first skin layer consists essentially of at least one polyethylene having a density of about 0.940 g/cm$^3$ or less, and (b) an adhesive layer having an upper surface and a lower surface wherein the upper surface of the adhesive layer is adhesively joined to the lower surface of the base layer.

69. A multilayer film facestock for labels comprising a base layer having an upper surface and a lower surface, and at least one first skin layer in contact with the upper surface of the base layer wherein the base layer comprises a machine direction only oriented and heat set polyethylene having a density above about 0.940 g/cm$^3$, and the first skin layer consists essentially of at least one polyethylene having a density of about 0.940 g/cm$^3$ or less.

* * * * *